US005682973A

United States Patent [19]

Holmes et al.

[11] Patent Number: 5,682,973

[45] Date of Patent: Nov. 4, 1997

[54] MAIL DECELERATING DEVICE

[75] Inventors: Lawrence B. Holmes, Hunt Valley, Md.; Renato Gritti, Rapallo; Giuseppe Puzzanghera, Genova Sestri Ponente, both of Italy

[73] Assignee: Finmeccanica S.p.A., Rome, Italy

[21] Appl. No.: 761,281

[22] Filed: Dec. 6, 1996

Related U.S. Application Data

[63] Continuation of Ser. No. 513,383, Aug. 11, 1995, abandoned.

[30] Foreign Application Priority Data

Aug. 12, 1994 [IT] Italy .................................. TO94A0664

[51] Int. Cl.[6] .................................................... B65G 47/19

[52] U.S. Cl. ......................... 198/534; 198/532; 198/956; 271/225

[58] Field of Search .................................... 198/530, 531, 198/532, 534, 550.01, 956; 271/225, 292

[56] References Cited

U.S. PATENT DOCUMENTS

| | | | |
|---|---|---|---|
| 2,822,953 | 2/1958 | Kunath | 198/956 X |
| 2,840,226 | 6/1958 | Jones | 198/532 X |
| 4,149,622 | 4/1979 | Bradshaw et al. | 198/530 X |
| 4,193,489 | 3/1980 | Siniscal | 198/534 X |
| 4,380,332 | 4/1983 | Davis | 198/956 X |
| 4,541,228 | 9/1985 | Petersen | 198/530 X |
| 5,362,040 | 11/1994 | Midavaine et al. | 271/225 |
| 5,462,268 | 10/1995 | Remy et al. | 271/225 |
| 5,494,150 | 2/1996 | McDonell et al. | 198/956 X |

FOREIGN PATENT DOCUMENTS

| | | |
|---|---|---|
| 582 869 | 7/1993 | European Pat. Off. . |
| 608161 | 7/1994 | European Pat. Off. . |
| 2677626 | 12/1992 | France . |
| 1406963 | 10/1968 | Germany . |

*Primary Examiner*—James R. Bidwell
*Attorney, Agent, or Firm*—Lowe, Price, LeBlanc & Becker

[57] ABSTRACT

A mail decelerating device wherein a straight channel with a V-shaped cross section is supplied by a conveyor channel with a number of mail items; the mail item is intercepted and directed by a deflecting element towards an inclined wall of the V-section channel, along which it slides and is arrested on striking a kinetic energy dissipating device at one end of the V-section channel; following stoppage of the item, a bottom opening in the V-section channel is opened, and through which the mail item drops out by force of gravity.

14 Claims, 5 Drawing Sheets

MAIL DECELERATING DEVICE

This application is a continuation application Ser. No. 08/513,383 filed Aug. 11, 1995, now abandoned.

BACKGROUND OF THE INVENTION

The present invention relates to a mail decelerating device.

Mail sorting devices are known which provide for withdrawing flat rectangular mail items one at a time from a stack of superimposed items.

European Patent Application EP-A-582.869 by FINMECCANICA S.p.A., for example, relates to a sorting device comprising an inclined rectangular surface for supporting a stack of mail items, which is pushed by a slide along the inclined surface to a stop device fitted to the upper end edge of the surface.

Sorting devices of the above type feed the mail items to a conveyor channel along which they travel separately.

The mail items are fed along the conveyor channel at substantially constant speed (e.g. about 2.8–3 meters/second) by devices, e.g. pinch rollers, engaging lateral portions of the item.

SUMMARY OF THE INVENTION

It is an object of the present invention to provide a device for receiving the moving mail items from the conveyor channel, and for decelerating and arresting them.

It is a further object of the present invention to provide a device for withdrawing each arrested mail item one at a time, and feeding it to a known external conveyor device (e.g. presenting a number of carriages, each comprising a number of side by side, prismatic containers).

According to the present invention, there is provided a mail decelerating device, characterized in that it comprises:

a straight channel presenting a substantially V-shaped cross section, and defined, among other things, by at least one lateral wall inclined in relation to an opposite side wall, said V-section channel presenting an input communicating with conveyor means for supplying the V-section channel with a number of mail items;

deflecting means for directing the mail items fed into said V-section channel towards said inclined lateral wall; and energy dissipating means located at the opposite end of said V-section channel to said input, and for dissipating at least part of the kinetic energy of the items fed by said conveyor means into said V-section channel.

The present invention also relates to a device wherein said V-section channel presents a bottom opening fitted with shutter means;

paid shutter means being movable between an idle position wherein said opening is inaccessible, and an activating position wherein said bottom opening is accessible and permits said mail items to drop by force of gravity out of said V-section channel.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
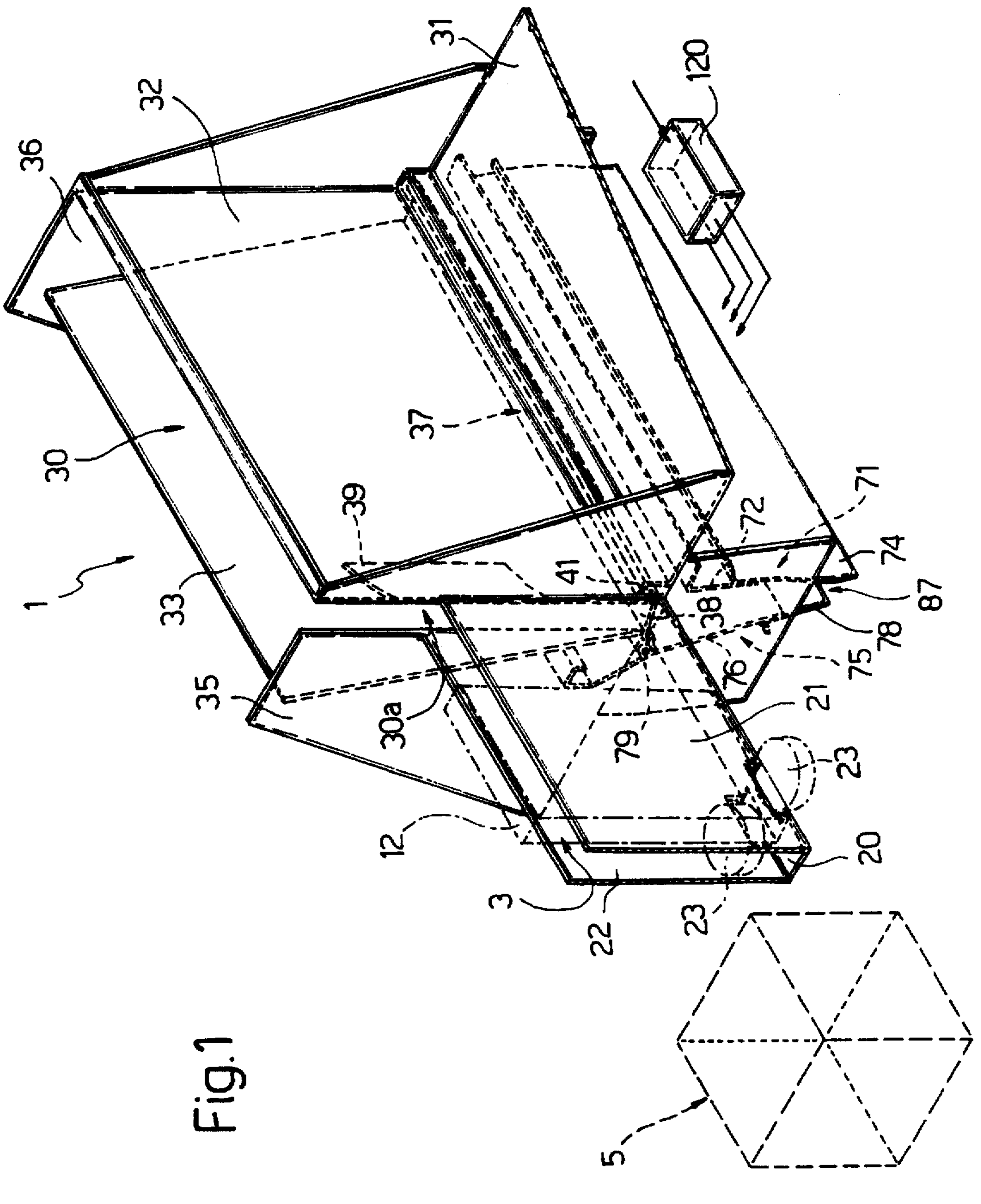
FIG. 1 shows a view in perspective of a decelerating device in accordance with the teachings of the present invention.

Number 1 in FIG. 1 indicates a mail decelerating device communicating with the output of a straight conveyor channel 3 extending from a known sorting device 5 (shown schematically).

Sorting device 5 provides for supplying channel 3 one at a time with a number of flat rectangular mail items 12, such as letters, envelopes, magazines, newspapers, etc.

Figure 5:
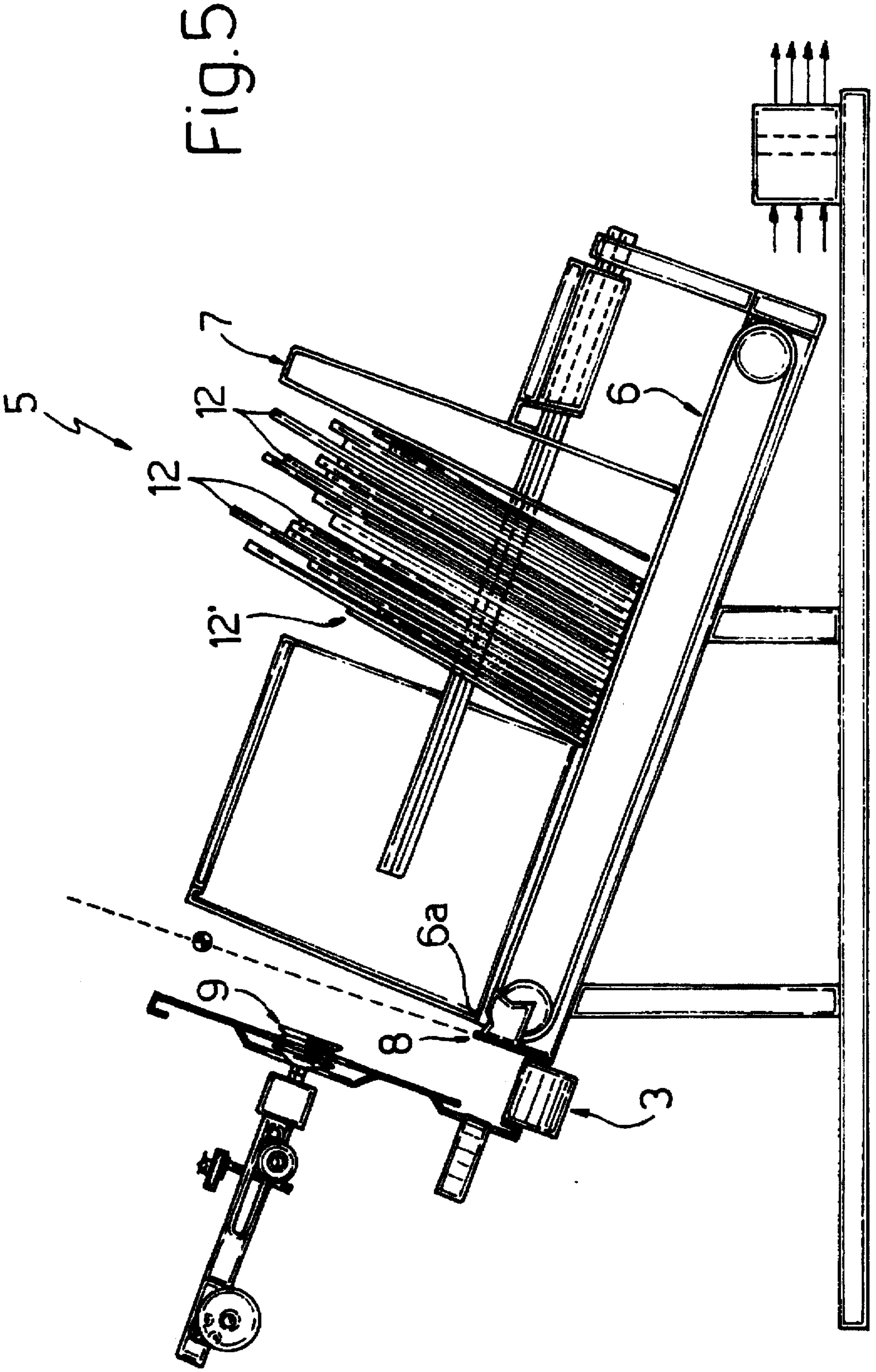
FIG. 5 shows a sorting device which may be used for supplying mail items to the decelerating device according to the present invention.

Sorting device 5 may, for example, be of the type described in European Patent Application EP-A-582.869 by FINMECCANICA S.p.A., and may comprise (FIG. 5) an inclined rectangular surface 6 for supporting a stack of flat rectangular mail items 12, which is pushed by a slide 7 along inclined surface 6 to a stop device S fitted to the upper end edge 6*a* of surface 6. Sorting device 5 also comprises a gripping head 9 movable in crank and slotted link manner to and from inclined surface 6, and for withdrawing mail items 12 one at a time from the stack, and feeding them to conveyor channel 3. More specifically, gripping head 9 conveniently comprises a number of suction cups for engaging the front surface 12' of the item 12 contacting stop device 8.

As shown particularly in FIG. 1, channel 3 presents a rectangular cross section, and comprises a rectangular bottom wall 20 and two rectangular lateral walls 21, 22.

Conveyor channel 3 comprises a number of known pinch roller devices 23 located along walls 21, 22, and which provide for engaging opposite lateral portions of items 12, and feeding items 12 towards device 1.

Decelerating device 1 comprises a straight channel 30 presenting an input 30*a* communicating with the output of conveyor channel 3.

Channel 30 presents a substantially V-shaped cross section, and is supported on a horizontal supporting surface 31 fitted to a bed (not shown).

More specifically, channel 30 is defined by a first rectangular lateral wall 32 continuing from wall 21 and perpendicular to surface 31; by a second rectangular lateral wall 33 inclined roughly 15° in relation to wall 32; by a trapezoidal wall 35 from which channel 3 extends; and by a trapezoidal wall 36 opposite and parallel to wall 35. At the bottom, channel 30 presents a rectangular opening 37 (FIGS. 1, 3) extending substantially the full length of channel 30, and which is closed by a movable bottom wall 38, and is located at a through opening 40 in supporting surface 31 (FIG. 3).

Channel 30 is longer than the maximum length of the items 12 conveyed along channel 3.

Channel 30 presents a deflecting element 39 located close to input 30*a* and comprising a rectangular appendix made of flexible plastic material and extending from wall 32 towards wall 33.

Figure 2:
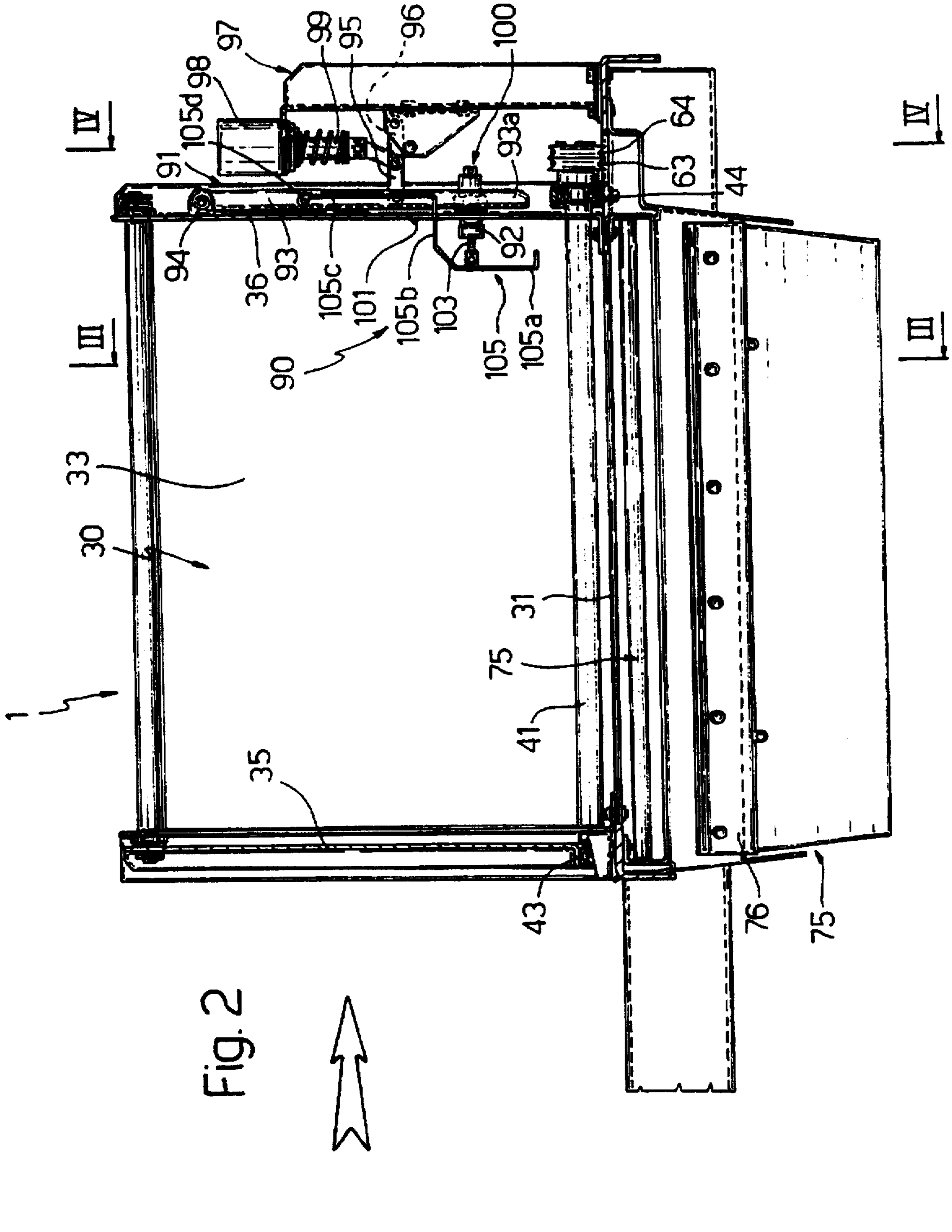
FIG. 2 shows a longitudinal section of the FIG. 1 device.
Figure 3:
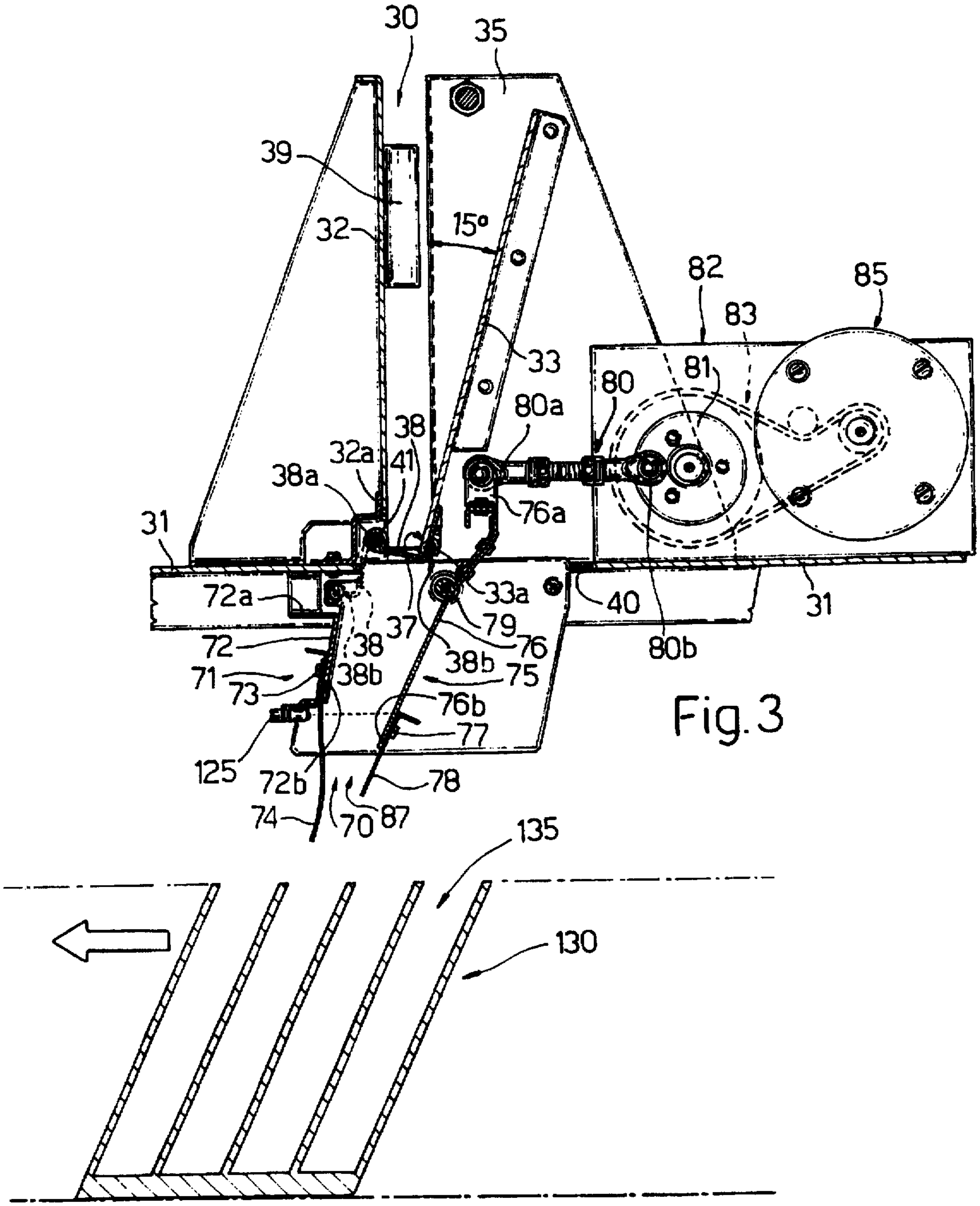
FIG. 3 shows a section of the device along line III—III in FIG. 2.

As shown particularly in FIGS. 1 and 3, bottom wall 38 is substantially rectangular, and is integral with a shaft 41 extending along a long edge 38*a* of wall 38, and presenting end portions supported on bearings 43, 44 (FIG. 2) fitted to walls 35, 36.

Shaft 41 also extends parallel to and a short distance from the straight bottom edge 32*a* of wall 32, and is movable angularly by an actuating device 46 (FIG. 4) fitted to horizontal supporting surface 31.

More specifically, bottom wall 38 is movable between an idle position (shown by the continuous line in FIG. 3) wherein it closes opening 37 with a long straight edge 38*b* contacting the bottom edge 33*a* of wall 33, and an activating position (shown by the dotted line in FIG. 4) wherein wall 38 is substantially coplanar with wall 32, and opening 37 is accessible.

Figure 4:
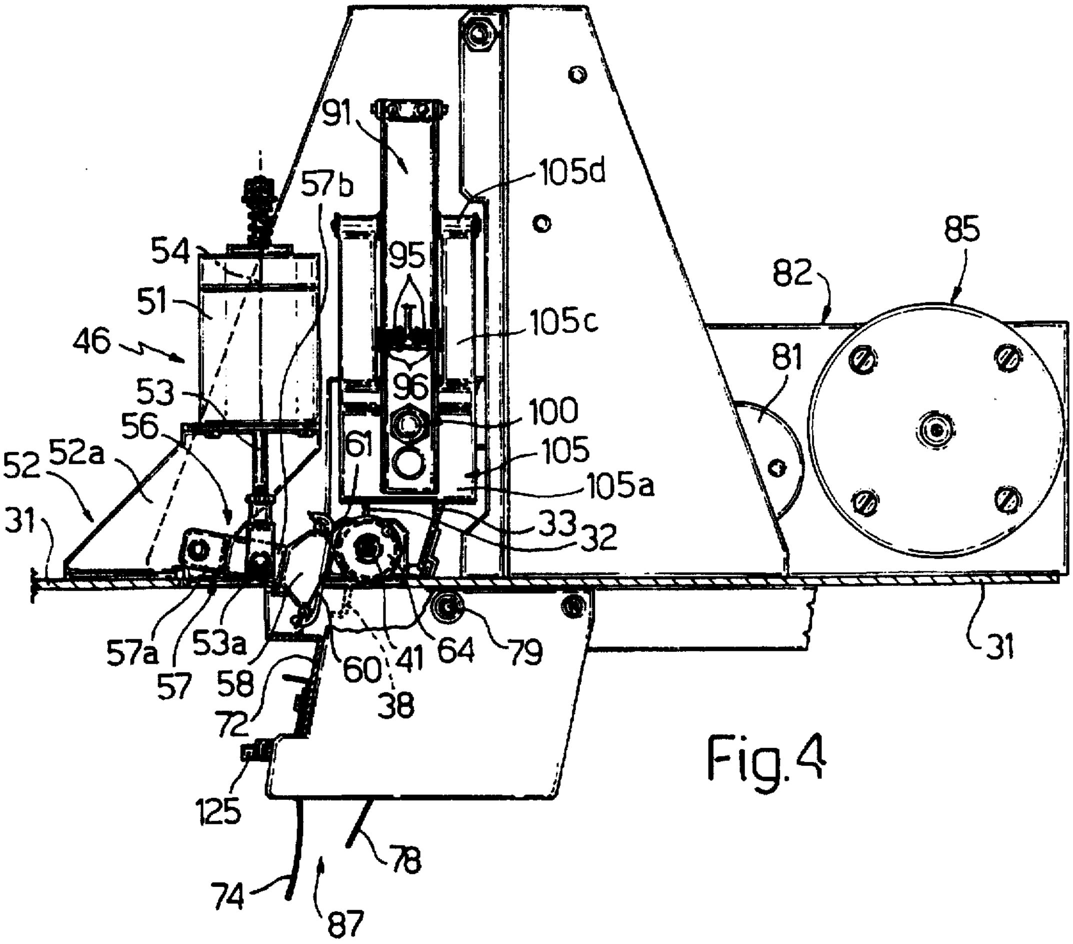
FIG. 4 shows a section of the device along line IV—IV in FIG. 2.

As shown particularly in FIG. 4, actuating device 46 comprises an electromagnetic actuator 51 fitted to a vertical support 52 extending upwards from supporting surface 31; and electromagnetic actuator 51 presents an output shaft 53 movable back and forth along an axis 54 perpendicular to surface 31, and connected to a T-shaped element 56 hinged to support 52.

More specifically, T-shaped element 56 comprises a straight element 57 with a free end 57*a* hinged to wall 52*a* of support 52; and a substantially trapezoidal element 58 crosswise to straight element 57; and straight element 57 presents a central portion 57*b* hinged to the bottom end portion 53*a* of shaft 53.

The opposite end portions of trapezoidal element 58 are fitted with the first ends of cables 60, 61, the second ends (not shown) of which are fitted to respective pulleys 63, 64 (FIG. 2) fitted to the free end of shaft 41. Cables 60, 61 are wound oppositely about pulleys 63, 64, and provide for transmitting the rotation of element 56 to shaft 41.

As shown particularly in FIG. 3, device 1 also comprises a guide device 70 for defining the path of items 12 falling by force of gravity through opening 37.

Device 70 comprises a roughly vertical, fixed first deflector 71 extending beneath supporting surface 31 in a straight direction parallel to bottom edge 32*a* of wall 32.

Deflector 71 comprises a substantially flat, rectangular, metal upper portion 72 presenting a top edge 72*a* fitted to supporting surface 31, and a bottom edge 72*b* fitted by screws 73 to a shaped bottom portion 74 made of pliable fabric.

Device 70 also comprises a movable second deflector 75 facing first deflector 71 and extending beneath supporting surface 31.

Second deflector 75 comprises a metal upper portion 76 presenting a bottom edge 76*b* fitted by screws 77 to a shaped bottom portion 78 made of pliable fabric.

Upper portion 76 is roughly rectangular, and is supported on a straight shaft 79 which is fitted to the face of portion 76 facing deflector 71, and which extends parallel to edge 33*a* and beneath supporting surface 31.

Shaft 79 also presents end portions (not shown) supported on bearings (not shown) fitted to appendixes (not shown) of supporting surface 31.

Upper portion 76 also presents a top edge 76*a* above surface 31 and hinged to a first end 80*a* of a rod 80, the second end 80*b* of which is hinged eccentrically to a pulley 81 fitted to a supporting structure 82 in turn fitted to supporting surface 31 and located to one side of wall 33. By means of a belt drive 83, pulley 81 is driven by an electric motor 85 fitted to structure 82; pulley 81 in turn activates rod 80; and, by virtue of the connection defined by shaft 79, the rotation of pulley 81 rotates deflector 75 back and forth about shaft 79 and hence to and from deflector 71.

Deflectors 71, 75 define a drop channel 87 presenting a substantially V-shaped cross section and decreasing in width downwards from opening 37 to bottom fabric portions 74, 78.

As shown particularly in FIG. 2, device comprises a kinetic energy dissipating device 90 for decelerating items 12 fed from conveyor channel 3 to V-section channel 30.

Device 90 comprises a mechanism 91 fitted to wall 36; and a pneumatic damper 92 fitted to mechanism 91.

More specifically, mechanism 91 comprises a straight arm 93 hinged at the top to an appendix 94 extending perpendicularly outwards of channel 30 from wall 36. Arm 93 presents a free bottom portion 93*a*; and an intermediate portion hinged, by means of two consecutive, straight, articulated arms 95, 96, to a vertical support 97 extending perpendicularly from surface 31 on one side of wall 36, and fitted at the top with an electromechanical actuator 98 presenting a vertical output shaft 99 hinged to the hinge connecting arms 95, 96. Arm 93 is movable by actuator 98 between an idle position (FIG. 2) wherein it is substantially vertical and parallel to wall 36, and arms 95, 96 are aligned with each other and perpendicular to arm 93, and an activating position (not shown) wherein arm 93 is inclined away from wall 36, and arms 95, 96 are bent in the form of a V.

Damper 92 is supported on arm 93, and comprises a cylindrical casing 100 screwed to arm 93 and engaging an opening 101 in wall 36; and an output shaft 103 extending from the end of casing 100 facing channel 30, and which is connected to a shaped plate 105 hinged to arm 93. More specifically, plate 105 comprises a straight bottom portion 105*a* fitted perpendicularly to shaft 103; an intermediate portion 105*b* perpendicular to portion 105*a*; and a top portion 105*c* parallel to portion 105*a* and presenting a top end 105*d* hinged to arm 93. In the idle position, plate 105 is located inside channel 30, with portion 105*a* perpendicular to bottom wall 38; and, in the activating position, plate 105 is located outside channel 30.

Device 1 is controlled by a central electronic unit 120 (FIG. 1) which controls actuator 51, electromagnetic actuator 98 and electric motor 85.

Central unit 120 is supplied with electric signals from a number of optoelectronic sensors 125 fitted to deflector 71 at the connection of portions 72 and 74, and facing deflector 75.

In actual use, mail item 12 from conveyor channel 3 reaches V-section channel 30 at a speed of roughly 2.8 meters/second, and, on entering channel 30, is intercepted and directed by deflecting element 39 towards inclined wall 33; item 12 therefore comes to rest on inclined wall 33 along which it slides towards energy dissipating device 90 in the idle position; the vertical front edge of item 12 contacts bottom portion 105*a* of plate 105 which rotates about the top hinge and compresses pneumatic damper 92, so that item 12 dissipates most of its kinetic energy in the impact, and is slowed down to substantially zero speed; and, at the end of its deceleration, item 12 is positioned with its straight bottom edge resting on bottom wall 38.

In the event of it bouncing, item 12 slides along wall 33 in the opposite direction tó insertion, and contacts wall 35 which prevents it from being expelled from channel 30.

Electronic central unit 120 then activates electromagnetic actuator 98 to rapidly reset dissipator 90 to the idle position.

Subsequently, on receiving an enabling signal from an external device (not shown), central unit 120 provides for shifting bottom wall 38 to enable access to opening 37; actuating device 46 is therefore activated to shift bottom wall 38 from the idle to the activating position; and item 12, by now stationary, drops by force of gravity through opening 37, without rotating and without contacting plate 105 which is positioned outside channel 30.

Item 12 drops down between deflectors 71 and 75 which define its path and direct it towards the opening 130 (shown schematically) of a container 135 (also shown schematically) located beneath channel 30 and traveling at constant speed in relation to device 1 in the direction shown by the arrow in FIG. 3.

More specifically, container 135 presents lateral walls inclined to the horizontal, and is connected to other adjacent containers to form a movable carriage.

Upon the top edge of item 12 moving past the optical paths of sensors 125, motor 85 is activated to move deflector 75.

More specifically, movable deflector 75 is moved towards fixed deflector 71 to follow the movement of container 135 and ensure correct insertion of item 12 inside the container, which insertion is effected rapidly (in roughly 450 milliseconds).

Device 1 thus provides for decelerating and arresting the mail items from conveyor channel 3, and for withdrawing the arrested items one by one from channel 30.

Deflectors 71, 75 also provide for inserting items 12 into moving containers.

Clearly, changes may be made to device 1 as described and illustrated herein without, however, departing from the scope of the present invention.

We claim:

1. A mail decelerating device, characterized in that it comprises:

a straight channel (30) presenting a substantially V-shaped cross section, and defined, among other things, by at least one lateral wall (33) inclined in relation to an opposite side wall (32), said V-section channel (30) presenting an input (30*a*) communicating with conveyor means (3) for supplying the V-section channel (30) with a number of mail items (12);

deflecting means (39) for directing the mail items (12) fed into said V-section channel (30) towards said inclined lateral wall (33); and energy dissipating means (90) located at the opposite end (36) of said V-section channel (30) to said input (30*a*), and for dissipating at least part of the kinetic energy of the items (12) fed by said conveyor means (3) into said V-section channel (30).

2. A device as claimed in claim 1, characterized in that said V-section channel (30) presents a bottom opening (37) fitted with shutter means (38);

said shutter means (38) being movable between an idle position wherein said opening (37) is closed, and an activating position wherein said bottom opening (37) is accessible and permits said mail items (12) to drop by force of gravity out of said V-section channel (30).

3. A device as claimed in claim 2, characterized in that said V-section channel (30) is defined by a substantially rectangular said inclined lateral wall (33), by said side wall (32), and by a first and second end wall (35, 36) facing each other;

said inclined lateral wall (33) and said side wall (32) presenting respective straight bottom edges (33*a*, 32*a*) defining respective opposite edges of said bottom opening (37);

said shutter means comprising a bottom wall (38) for closing said bottom opening (37);

and said bottom wall (38) being connected to an angularly movable shaft (41) parallel to said straight bottom edges (33*a*, 32*a*).

4. A device as claimed in claim 3, characterized in that it comprises first actuating means (46) for angularly moving said shaft (41).

5. A device as claimed in claim 4, characterized in that said first actuating means (46) comprise:

electromagnetic actuating means (51) fitted to a support (52) and presenting an output shaft (53) connected to a T-shaped element (56);

said T-shaped element (56) comprising a straight element (57) with a free end (57*a*) hinged to said support (52*a*); and a transverse element (58) perpendicular to said straight element (57);

said straight element (57) presenting a central portion (57*b*) hinged to an end portion (53*a*) of said output shaft (53);

and said transverse element (58) presenting opposite end portions fitted to the first ends of cables (60, 61), the second ends of which are fitted to respective pulleys (63, 64) fitted to the free end of said angularly movable shaft (41).

6. A device as claimed in claim 1, characterized in that said dissipating means (90) comprise a mechanism (91) fitted to a wall (36) of said V-section channel; and at least one damper (92) fitted to said mechanism (91) and presenting an output shaft connected to a stop wall (105) forming a stop for the mail items (12) fed into said V-section channel (30).

7. A device as claimed in claim 6, characterized in that said mechanism comprises:

at least a straight oscillating arm (93) presenting a first end hinged to the wall (36) defining said end of said V-section channel (30); and a free second end (93*a*); and means (95, 96, 97, 98) for retracting said straight oscillating arm;

said damper (92) being fitted to said straight oscillating arm (93); and said stop wall (105) being hinged to said straight oscillating arm (93).

8. A device as claimed in claim 7, characterized in that said retracting means comprise:

two consecutive straight articulated arms (95, 96) interposed between said straight oscillating arm (93) and a vertical support (97); and electromechanical actuating means (98) presenting an output shaft (99) hinged to the hinge connecting said straight articulated arms (95, 96).

9. A device as claimed in claim 2, characterized in that said bottom opening (37) presents diverting means (71, 75) defining the fall path along which said mail items (12) drop by force of gravity from said bottom opening (37).

10. A device as claimed in claim 9, characterized in that said diverting means (71, 75) comprise a first deflector (71), and a second deflector (75) facing and movable to and from said first deflector (71);

said first and second deflectors (71, 75) being located along opposite straight edges (33*a*, 32*a*) of said bottom opening (37).

11. A device as claimed in claim 10, characterized in that said first and second deflectors (71, 75) comprise respective rigid upper portions (72; 76) close to said bottom opening (37); and respective at least partially pliable bottom portions (74; 78).

12. A device as claimed in claim 10, characterized in that said second deflector (75) is angularly movable, by second actuating means (85), about an axis (79) parallel to said straight edges (33*a*, 32*a*) of said bottom opening (37).

13. A device as claimed in claim 12, characterized in that it comprises sensor means (125) fitted to said deflectors (71), and for detecting the passage of said mail items (12) between the deflectors (71, 75), and for generating an item-in-transit signal;

said second actuating means (85) being activated by said item-in-transit signal.

14. A device as claimed in claim 9, characterized in that it comprises a conveyor device outside said V-section channel (30);

said conveyor device comprising at least one carriage located beneath and movable in relation to said V-section channel;

said bottom opening (37) facing said external conveyor device; and said fall path being such as to intersect the opening (135) of a container (130) of said carriage.

* * * * *